US006338404B1

(12) United States Patent
Chen

(10) Patent No.: US 6,338,404 B1
(45) Date of Patent: Jan. 15, 2002

(54) LOCKING DEVICE OF POWER HAND TOOL

(75) Inventor: Ting-Kuang Chen, Keelung (TW)

(73) Assignee: Power Network Industry Co., Ltd., Taipei (TW)

( * ) Notice: Subject to any disclaimer, the term of this patent is extended or adjusted under 35 U.S.C. 154(b) by 0 days.

(21) Appl. No.: 09/577,683

(22) Filed: May 22, 2000

(51) Int. Cl.[7] .......................... B25B 23/14; F16D 43/20

(52) U.S. Cl. ......................... 192/223; 74/625; 173/178; 192/54.5

(58) Field of Search ............................... 192/223, 54.5, 192/37, 43.1, 45.1; 188/134; 81/476, 59.1, 62, 57.11; 173/178, 176, 216, 217; 74/625

(56) References Cited

U.S. PATENT DOCUMENTS

| | | | | | |
|---|---|---|---|---|---|
| 3,051,282 A | * | 8/1962 | Greene | 192/223 | |
| 3,374,869 A | * | 3/1968 | Steinke | 192/37 X | |
| 3,587,796 A | * | 6/1971 | Nestvogel | 192/223 | |
| 4,448,098 A | * | 5/1984 | Totsu | 81/57.11 X | |
| 4,466,523 A | * | 8/1984 | De Carolis et al. | 192/43.1 | |
| 4,574,928 A | * | 3/1986 | Norton | 192/43.1 X | |
| 4,645,050 A | * | 2/1987 | Ingenhoven | 192/54.5 X | |
| 6,035,947 A | | 3/2000 | Chung | | |

FOREIGN PATENT DOCUMENTS

| | | | | |
|---|---|---|---|---|
| JP | 58-131432 | * | 8/1983 | 192/223 |

* cited by examiner

*Primary Examiner*—Rodney H. Bonck

(57) ABSTRACT

A locking device is provided between a gear train and an output shaft of a power hand tool. Pawls are arranged in a central bore of a fixed ring with an outer face thereof opposing an inner circumference of the central bore with a tiny gap therebetween. A coupler drivingly engages the shaft and the retention rings whereby when the coupler is rotated by the gear train, the coupler drives the disk and the pawls simultaneously and thus allowing the shaft to be rotated without constraint. When a user manually rotates the output shaft, the disk is rotated while the pawls are prevented from rotation about the first axis which causes a rotation of each pawl about the second axis leading to an interference between the outer face thereof and the inner circumference of the fixed ring thereby preventing the shaft from being further rotated.

7 Claims, 5 Drawing Sheets

LOCKING DEVICE OF POWER HAND TOOL

FIELD OF THE INVENTION

The present invention generally relates to a rotary type power hand tool having a rotational output shaft, and in particular to a locking device for fixing the output shaft during a power failure so as to allow the hand tool to be driven manually.

BACKGROUND OF THE INVENTION

A conventional rotary type power hand tool is powered by an external power source, such as an electric main, or a built-in power source, such as a rechargeable battery set. A rotary type power hand tool comprises a rotational output shaft having an outer tip to which a chuck is mounted for gripping for example a drill bit or a screwdriver. In case of power failure for externally powered tools or insufficiency of power supply of an internally powered tool, the drill bit may get stuck in a work piece. To remove the drill bit from the work piece, a rotation of the drill bit in an opposite direction is usually performed manually. It is thus desired to drive the drill bit by manually rotating the power tool in case of power failure.

Conventionally, the output shaft is driven by a motor via a gear train. No means is provided for fixing the output shaft whereby when a user tries to drive the drill bit by manually rotating the hand tool, a relative rotation occurs between the output shaft and the hand tool, preventing the user to drive the drill bit by manually rotating the hand tool.

Thus, it is desired to provide a locking device for fixing the output shaft to overcome the above problem.

SUMMARY OF THE INVENTION

Accordingly, an object of the present invention is to provide a locking device for a rotary type power hand tool which fixes an output shaft of the hand tool so as to allow a user to drive the output shaft by manually rotating the hand tool.

In accordance with the present invention, there is provided a locking device adapted to be arranged between a gear train and an output shaft of a power hand tool. The locking device comprises a fixed ring fixed in a housing of the hand tool. A disk drivingly engages the output shaft to be rotatable about a first axis. Separate locking pawls each having a second axis are concentrically arranged around the first axis and supported by a pair of retention rings to orbit about the first axis. Each pawl has a V-shaped projection received in a corresponding V-shaped notch defined in the disk whereby the pawl is capable of a very limited rotation about the second axis. The pawls are arranged in a central bore of the fixed ring with an outer face thereof opposing an inner circumference of the central bore with a tiny gap therebetween. A coupler drivingly engages the shaft and the retention rings whereby when the coupler is rotated by the gear train, the coupler drives the disk and the pawls simultaneously and thus allowing the shaft to be rotated without constraint. When a user manually rotates the output shaft, the disk is rotated while the pawls are prevented from rotation about the first axis which causes a rotation of each pawl about the second axis leading to an interference between the outer face thereof and the inner circumference of the fixed ring thereby preventing the shaft from being further rotated.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
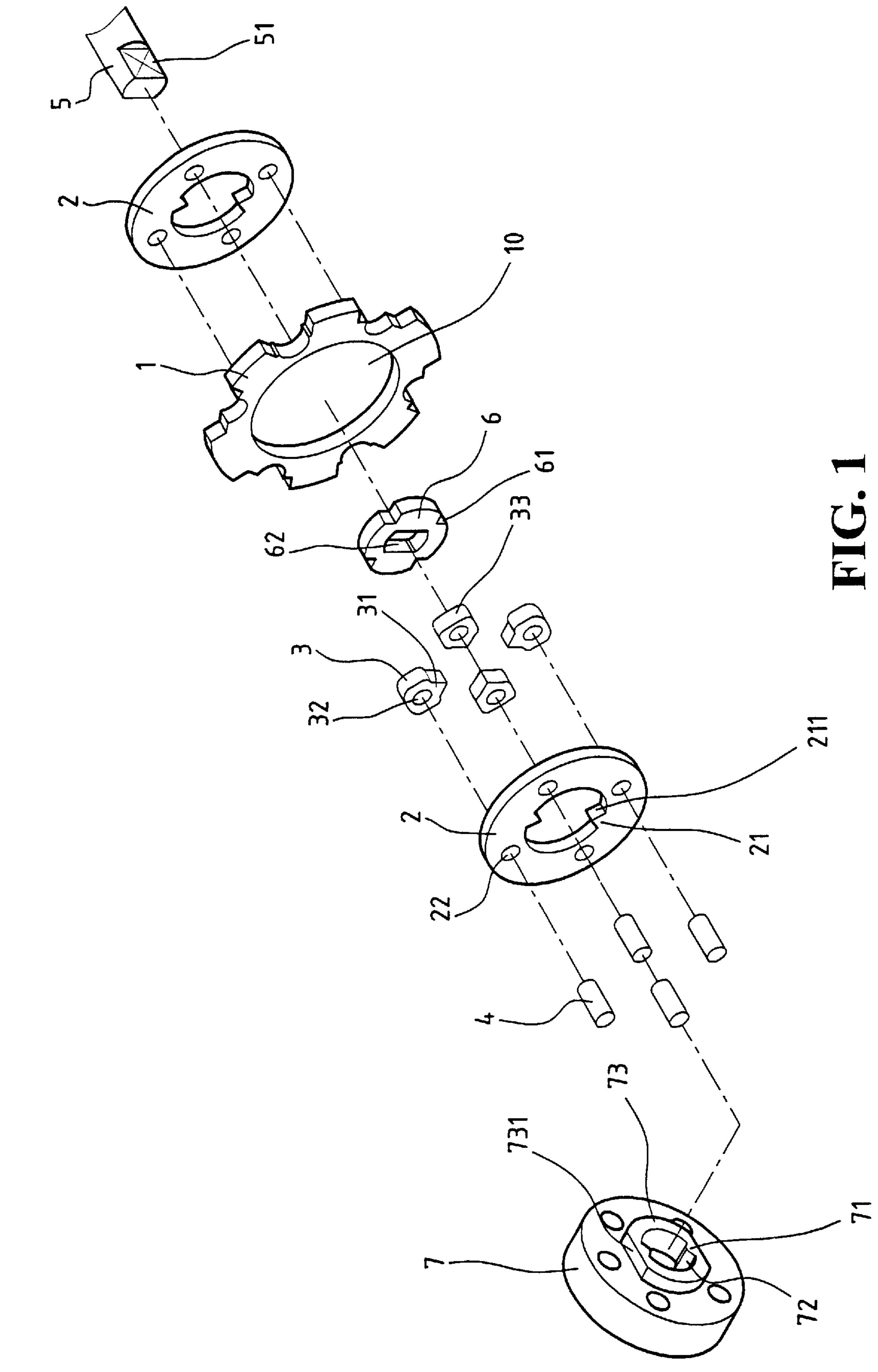
FIG. 1 is an exploded view of a locking device constructed in accordance with the present invention.

With reference to the drawings and in particular to FIG. 1, wherein a locking device constructed in accordance with the present invention is shown, the locking device is to be mounted in a rotary type power hand tool, such as a hand drill, between a torque source and an output shaft for locking the output shaft during a power failure. The locking device of the present invention comprises a fixed ring 1 adapted to be fixed inside a housing (not shown) of the hand tool. The fixed ring 1 defines a central bore 10 for accommodating a rotation prevention device.

The rotation prevention device comprises a central disk 6 defining a first axis and a plurality of locking pawls 3 arranged within the central bore 10 of the fixed ring 1. Two retention rings 2 having an outside diameter greater than a diameter of the central bore 10 of the fixed ring 1 are respectively attached to opposite sides of the fixed ring 1 for retaining the central disk 6 and the locking pawls 3 in position. The central disk 6 defines an elongate central slot 62 into which a flattened inner end of an output shaft 5 is snugly and drivingly received. The flattened inner end of the output shaft 5 forms two opposite flat surfaces 51 for engaging opposite edges of the elongate slot 62. An opposite outer end of the shaft 5 extends beyond the housing of the hand tool for engaging a working bit (not shown).

Figure 2:
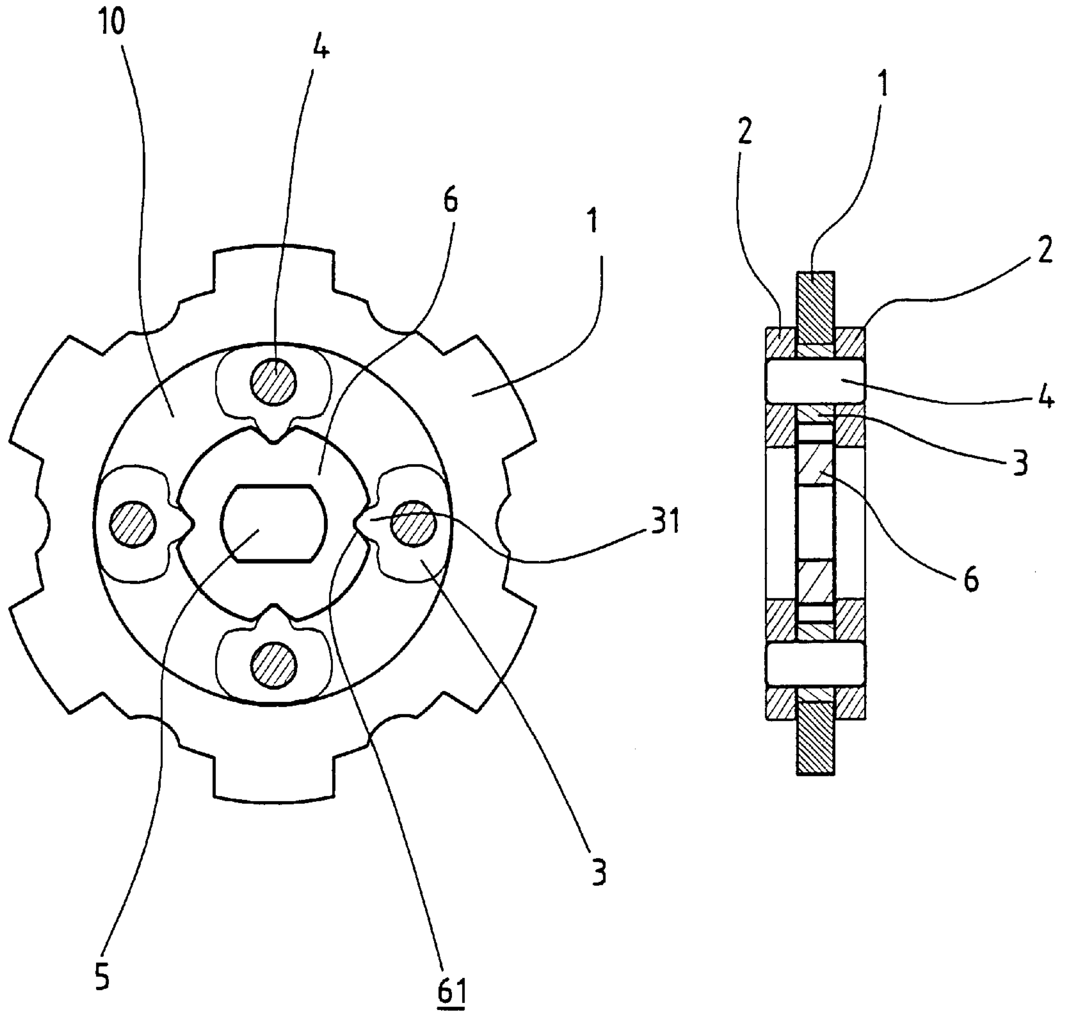
FIG. 2 is an end view of the locking device of the present invention, showing the locking device in an unlocked condition; and a side elevational view of the locking device of the present invention.
Figure 4:
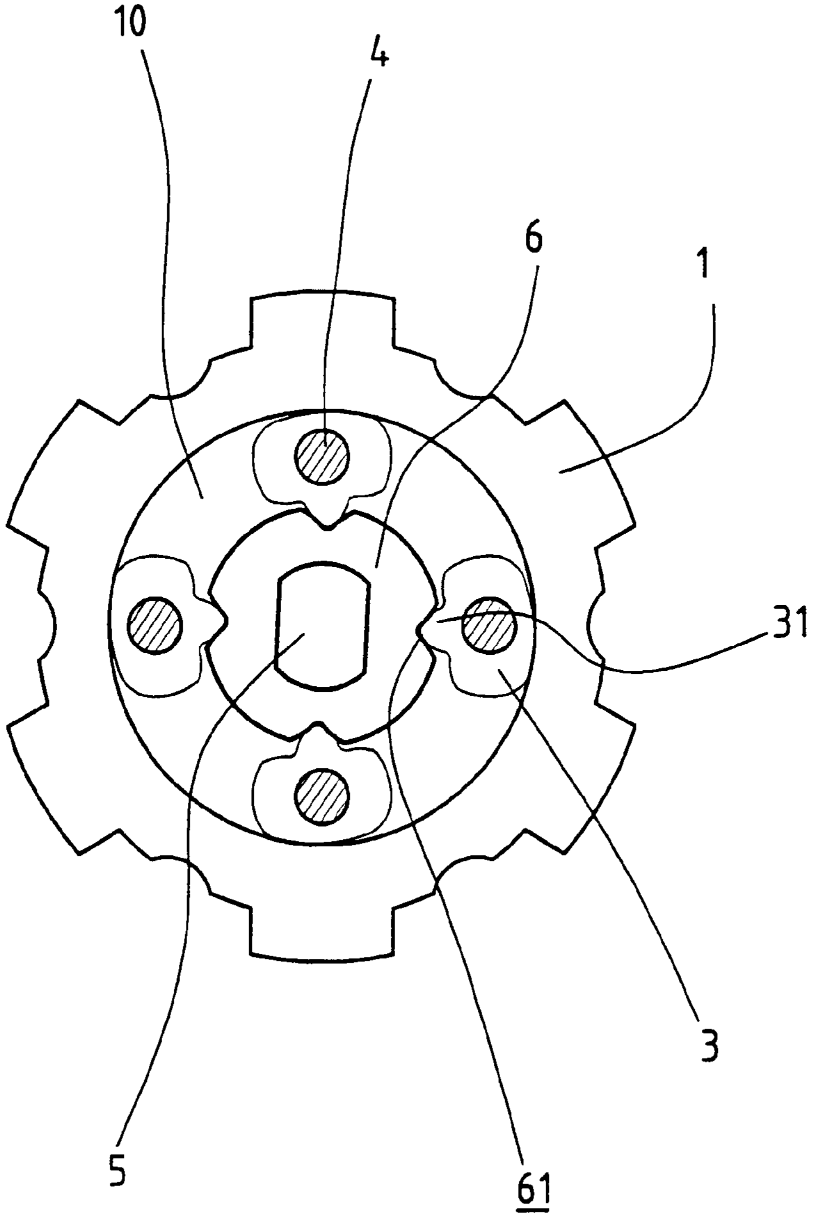
FIG. 4 is similar to FIG. 2 but showing a locked condition of the locking device of the present invention.
Figure 5:
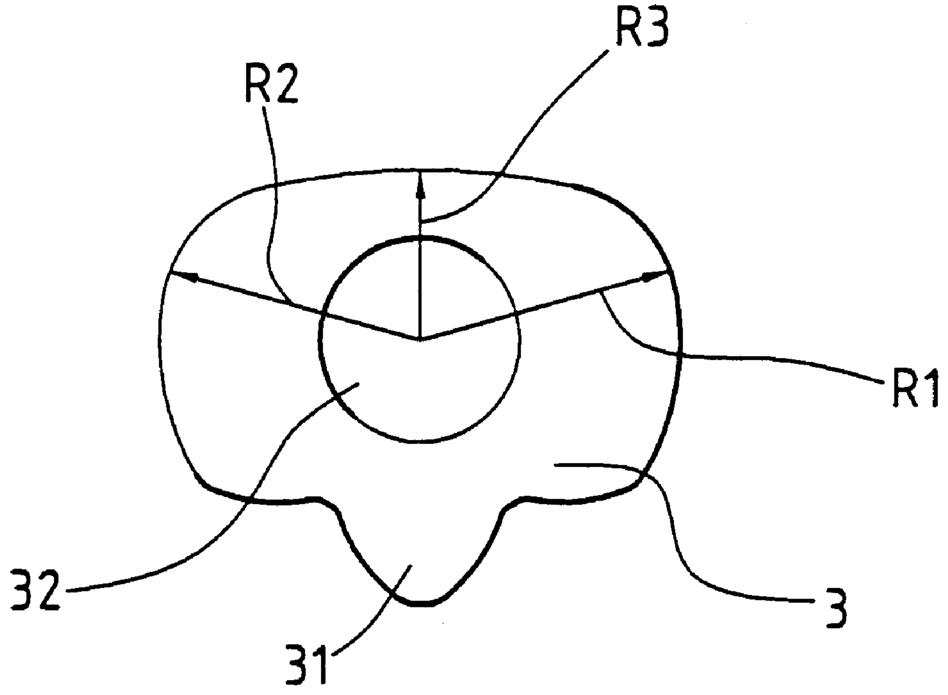
FIG. 5 is a plan view of a locking pawl of the locking device of the present invention.

Also referring to FIGS. 2, 4 and 5, a plurality of V-shaped notches 61 are defined in and substantially equally spaced along an outer circumference of the central disk 6 for receiving the locking pawls 3 therein. Each locking pawl 3 has a body (not labeled) forming an outer face 33 and a V-shaped projection 31 opposite to the outer face 33 for being received in the corresponding notch 61. The V-shaped notches 61 of the central disk 6 and the V-shaped projections 31 of the locking pawls 3 are made so as to allow the pawls 3 to move in the notches 61.

With the V-shaped projection 31 of each pawls 3 received in the corresponding notch 61 of the central disk 6, the outer face 33 of the pawl 3 defines a radius R3 which is very close to the inside diameter of the central bore 10 of the fixed ring 1 with a gap therebetween.

Each retention ring 2 defines a central bore (not labeled) and a plurality of retention holes 22 spaced along a circular path about a center of the retention ring 2. A pair of triangular projections 21, each forming two opposite inclining faces 211, is formed on an inner circumference of the central bore of the retention ring 2 and diametrically opposite to each other. The retention holes 22 of the retention rings 2 are substantially aligned with each other for receiving pins 4 therein. Each pin 4 extends in a second axis through a hole 32 defined in the body of each pawl 3 for pivotally supporting the pawl 3 in the central bore 10 of the fixed ring 1 as shown in FIGS. 2 and 4 whereby when the retention rings 2 rotate, the pawls 3 orbit about the first axis.

Figure 3:
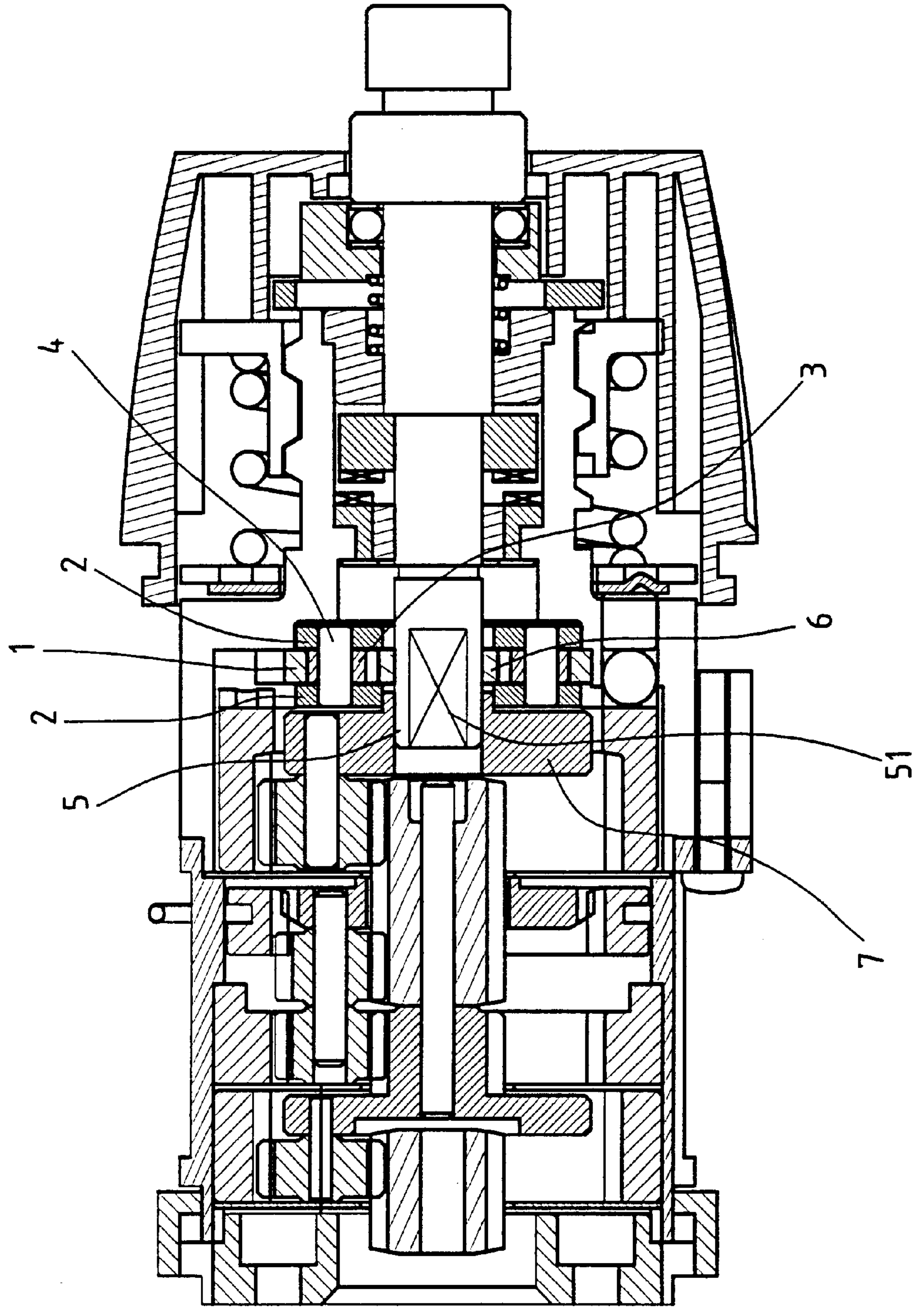
FIG. 3 is a cross-sectional view of a power hand tool incorporating the locking device of the present invention.

Also referring to FIG. 3, a coupler 7 mechanically couples the locking device to the torque source of the power hand tool via a speed reduction gear train (not labeled). The coupler 7 comprises a cylindrical body forming an axial projection 73 through which a central bore (not labeled) is defined. A pair of triangular projections 71 having opposite inclining faces 72 is formed on an inner circumference of the central bore and diametrically opposite to each other. The flattened inner end of the shaft 5 is received between the triangular projections 71 with the surfaces 51 of the shaft 5 engaging the triangular projections 71 whereby when the coupler 7 is driven by the speed reduction gear train, one of the inclining faces 72 of each triangular projection 71 of the coupler 7 drivingly engages the corresponding surface 51 of the shaft 5 so as to transmit rotational motion to the output shaft 5. In a normal operation, due to the engagement between the inner end of the shaft 5 and the disk 6, the disk 6 is rotated in unison with the shaft 5.

The axial projection 73 of the coupler 7 forms two parallel flat surfaces 731 on opposite sides thereof. The axial projection 73 is received in the central bore of one of the retention rings 2 whereby when the coupler 7 rotates, the flat surfaces 731 engage corresponding inclining faces 211 of the triangular projections 21 of the retention ring 2 for driving the retention rings 2 and the pawls 3 to rotate about the first axis with the coupler 7. Thus, the shaft 5 is driven by the coupler 7 and the disk 6 is driven by the shaft 5 while the pawls 3 are driven by the retention rings 2 which are in turn driven by the coupler 7. In other words, in a normal operation, both pawls 3 and disk 6 are rotated simultaneously thereby forming an unlocked condition as shown in FIG. 2 and causing no interference with the inner circumference of the central bore 10 of the fixed ring 1. The shaft 5 is allowed to rotate without constraints.

In case that the coupler 7 is not rotated due to for example a power failure, when a user attempts to manually rotate the output shaft 5, due to the engagement between the inner end of the shaft 5 and the disk 6, the disk 6 is also rotated. The pawls 3, however, are constrained by the retention rings 2 and are thus fixed, only being allowed to rotate about the pins 4 caused by the rotation of the disk 6. This leads to an interference between the outer face 33 of each pawl 3 and the inner circumference of the central hole 10 of the fixed ring 1 forming a locked condition as shown in FIG. 4 thereby effectively preventing the shaft 5 from being further rotated.

Although the present invention has been described with respect to the preferred embodiment, it is contemplated that a variety of modifications, variations and substitutions may be done without departing from the scope of the present invention that is intended to be defined by the appended claims.

What is claimed is:

1. A locking device adapted to be coupled between a torque source and an output shaft of a power hand tool for preventing the output shaft from being independently rotated, the locking device comprising:

a fixed ring fixed in the hand tool, the fixed ring defining a first central bore having an inner circumference;

a central disk coupled to an inner end of the output shaft to be rotatable in unison therewith about a first axis;

a plurality of locking pawls each in driving engagement with the central disk, the pawls and the central disk being arranged inside the first central bore so that an outer face of each pawl is approximate the inner circumference of the fixed ring with a gap therebetween;

at least one retention ring rotatably supporting the locking pawls with the locking pawls arranged around the first axis whereby when the retention ring rotates, the locking pawls orbit about the first axis, each locking pawl being rotatable about a second axis spaced from and parallel to the first axis; and a coupler mechanically connected to the torque source of the power hand tool, the coupler being in driving engagement with the retention ring and the shaft whereby when the coupler is rotated by the torque source, the retention ring and the shaft are driven simultaneously which in turn causes the locking pawls and the disk to rotate about the first axis;

wherein when the shaft is rotated, the central disk is driven while the locking pawls are fixed by the retention ring, a rotation of each pawl about the second axis thereof is resulted causing an interference between the outer face of the pawl and the inner circumference of the fixed ring thereby preventing the shaft from being further rotated.

2. The locking device claimed in claim 1, wherein the driving engagement between each locking pawl and the central disk comprises a V-shaped projection formed on the locking pawl for being received in a V-shaped notch defined in a circumference of the central disk, the V-shaped projection and the V-shaped notch being so configured to allow a limited rotation of the pawl about the second axis thereof.

3. The locking device as claimed in claim 1, wherein the retention ring defines a second central bore having an inner circumference with two opposite first triangular projections formed thereon, each first triangular projection having two opposite first inclining faces, the coupler forming an axial projection having two opposite parallel flat faces, the axial projection being received in the second central bore between the first triangular projections with the flat faces engaging the first triangular projections whereby the rotation of the coupler causes the flat faces thereof to engage the corresponding first inclining faces of the first triangular projections for forming the driving engagement between the coupler and the retention ring.

4. The locking device as claimed in claim 3, wherein the axial projection of the coupler defines a third central bore with two opposite second triangular projections formed therein for receiving a flattened inner end of the shaft therebetween, each second triangular projection having two opposite second inclining faces, the second triangular projections engaging with opposite surfaces of the flattened inner end of the shaft whereby the rotation of the coupler causes the second inclining faces of the second triangular projections to engage the surfaces of the shaft for forming the driving engagement between the coupler and the shaft.

5. The locking device as claimed in claim 1, wherein the axial projection of the coupler defines a central bore with two opposite triangular projections formed therein for receiving a flattened inner end of the shaft therebetween, each triangular projection having two opposite inclining faces, the triangular projections engaging with opposite surfaces of the flattened inner end of the shaft whereby the rotation of the coupler causes the inclining faces of the triangular projections to engage the surfaces of the shaft for forming the driving engagement between the coupler and the shaft.

6. The locking device as claimed in claim 1, wherein two retention rings are attached to opposite sides of the fixed ring, aligned holes being defined in the retention rings for receiving pivot pins extending through holes defined in the pawls thereby pivotally supporting the pawls therebetween.

7. The locking device as claimed in claim 1, wherein the central disk defines an elongate central slot for snugly receiving a flattened end of the shaft.

* * * * *